United States Patent
Behling et al.

(10) Patent No.: US 11,242,761 B2
(45) Date of Patent: Feb. 8, 2022

(54) TANGENTIAL ROTOR BLADE SLOT SPACER FOR A GAS TURBINE ENGINE

(71) Applicant: United Technologies Corporation, Farmington, CT (US)

(72) Inventors: Weston Behling, Norwalk, CT (US); Michael C. Weber, Niantic, CT (US); William B. McLean, East Hampton, CT (US); William S. Pratt, West Hartford, CT (US); Joon Ha, Glastonbury, CT (US)

(73) Assignee: Raytheon Technologies Corporation, Farmington, CT (US)

(*) Notice: Subject to any disclaimer, the term of this patent is extended or adjusted under 35 U.S.C. 154(b) by 0 days.

(21) Appl. No.: 16/793,307

(22) Filed: Feb. 18, 2020

(65) Prior Publication Data

US 2021/0254480 A1     Aug. 19, 2021

(51) Int. Cl.
*F01D 5/30* (2006.01)
*F01D 5/32* (2006.01)

(52) U.S. Cl.
CPC ............. *F01D 5/303* (2013.01); *F01D 5/32* (2013.01); *F05D 2260/30* (2013.01)

(58) Field of Classification Search
CPC .......... F01D 5/303; F01D 5/3038; F01D 5/30; F01D 5/32; F01D 5/3092
USPC ......................................... 416/215, 221, 218
See application file for complete search history.

(56) References Cited

U.S. PATENT DOCUMENTS

| 3,778,191 | A | * | 12/1973 | Brockmann | F01D 5/3038 416/215 |
| 3,784,320 | A | * | 1/1974 | Rossmann | F01D 5/3084 416/215 |
| 6,398,499 | B1 | | 6/2002 | Simonetti et al. | |
| 8,206,116 | B2 | | 6/2012 | Pickens et al. | |
| 8,251,667 | B2 | * | 8/2012 | Wilson | F01D 5/3038 416/217 |
| 8,845,294 | B2 | | 9/2014 | Belmonte et al. | |
| 8,899,933 | B2 | * | 12/2014 | Farineau | F01D 5/32 416/215 |
| 8,925,201 | B2 | | 1/2015 | Frédérick | |
| 8,998,579 | B2 | | 4/2015 | Belmonte et al. | |
| 9,004,872 | B2 | | 4/2015 | Aiello et al. | |
| 9,145,784 | B2 | | 9/2015 | Evans et al. | |

(Continued)

FOREIGN PATENT DOCUMENTS

| EP | 2511480 | A2 | 10/2012 | |
| EP | 2886799 | A1 * | 6/2015 | ............. F01D 5/303 |

(Continued)

OTHER PUBLICATIONS

English translation of FR 1281536A (Year: 1962).*

(Continued)

*Primary Examiner* — David E Sosnowski
*Assistant Examiner* — Wesley Le Fisher
(74) *Attorney, Agent, or Firm* — Bachman & LaPointe, P.C.

(57) ABSTRACT

A rotor disk assembly for a gas turbine engine includes a rotor disk that defines an axis, the rotor disk comprising a slot within a rim of the disk and a spacer within the slot, the spacer having a clearance feature sized to permit rotation of a rotor blade from an insertion position to an installed position.

17 Claims, 15 Drawing Sheets

(56) References Cited

U.S. PATENT DOCUMENTS

| | | |
|---|---|---|
| 10,107,114 B2 | 10/2018 | Aiello et al. |
| 10,267,166 B2 | 4/2019 | Cosi et al. |
| 2013/0170996 A1* | 7/2013 | Farineau ................. F01D 5/225 |
| | | 416/219 R |
| 2013/0287556 A1* | 10/2013 | Keny ........................ F01D 5/32 |
| | | 415/182.1 |
| 2014/0182293 A1 | 7/2014 | Aiello et al. |
| 2015/0139808 A1* | 5/2015 | Kloetzer ............... F01D 5/3038 |
| | | 416/193 A |
| 2016/0341052 A1 | 11/2016 | Li et al. |

FOREIGN PATENT DOCUMENTS

| | | | | |
|---|---|---|---|---|
| EP | 3159483 A1 * | 4/2017 | ........... | F01D 5/3038 |
| FR | 1281536 A * | 1/1962 | ........... | F01D 5/3038 |

OTHER PUBLICATIONS

English translation of EP 2886799A1 (Year: 2015).*
English translation of EP3159483A1 (Year: 2015).*
EP Search Report dated Jun. 15, 2021 issued for corresponding European Patent Application No. 20215782.2.

* cited by examiner

TANGENTIAL ROTOR BLADE SLOT SPACER FOR A GAS TURBINE ENGINE

U.S. GOVERNMENT RIGHTS

This invention was made with Government support awarded by the United States. The Government has certain rights in this invention.

BACKGROUND

This application relates generally to a gas turbine engine rotor disk assembly and more specifically to a spacer within a tangential blade slot therefor.

Gas turbine engines, such as those that power modern commercial and military aircraft, generally include a compressor to pressurize an airflow, a combustor to burn a hydrocarbon fuel in the presence of the pressurized air, and a turbine to extract energy from the resultant combustion gases. Air is compressed in various fan and compressor stages by rotor blades which cooperate with stator vanes. Fan air provides bypass propulsion thrust while compressor air is mixed with fuel and ignited for generation of hot combustion gases from which energy is extracted by a turbine section which powers the compressor and fan sections.

The compressor and turbine sections may include a rotor assembly with arrays of removable blades. During assembly, the removable blades are inserted through load slots formed in opposed rails of the rotor disk. The load slots are formed at circumferentially spaced locations but may cause a stress concentration in an already highly stressed rotor attachment. Another rotor assembly inserts the blade through a clearance cut then rotates the blade 90 degrees to an installed position. The rotational insertion eliminates the load/lock slots, but the more numerous clearance cuts in the disk may also cause stress concentrations.

SUMMARY

A rotor disk assembly for a gas turbine engine according to one disclosed non-limiting embodiment of the present disclosure includes a rotor disk that defines an axis, the rotor disk comprising a tangential blade slot within a rim of the disk; and a spacer within the tangential blade slot forming a blade slot assembly, the spacer having a clearance feature sized to permit rotation of a rotor blade from an insertion position to an installed position.

A further embodiment of any of the foregoing embodiments of the present disclosure includes that the clearance features is a dimple.

A further embodiment of any of the foregoing embodiments of the present disclosure includes that the clearance features is a cut.

A further embodiment of any of the foregoing embodiments of the present disclosure includes that the spacer is comprised of a multiple of circumferential segments.

A further embodiment of any of the foregoing embodiments of the present disclosure includes that each two of a multiple of the clearance features are circumferentially spaced to receive 4 to 8 rotor blades therebetween.

A further embodiment of any of the foregoing embodiments of the present disclosure includes that the slot within the rim of the disk comprises a forward rail and an aft rail spaced apart by a slot opening that is smaller than a rotor slot bottom.

A further embodiment of any of the foregoing embodiments of the present disclosure includes that the forward rail and the aft rail are continuous.

A further embodiment of any of the foregoing embodiments of the present disclosure includes that the spacer is comprised of a forward portion and an aft portion, each of the respective portions sized to fit through the slot opening.

A further embodiment of any of the foregoing embodiments of the present disclosure includes that a blade lug of the blade root region defines a maximum blade lug width and the tangential blade slot defines a maximum slot width, the slot width 5%-15% larger than the blade root width.

A method for assembling a rotor disk assembly, according to one disclosed non-limiting embodiment of the present disclosure includes providing a disk having a tangential blade slot; installing a spacer within the tangential blade slot forming a blade slot assembly, the spacer having a clearance feature sized to allow for blade rotation from an insertion position to an installed position; inserting the blade in the tangential blade slot assembly proximate to the clearance feature; rotating the blade 90 degrees using the clearance feature to the installed position.

A further embodiment of any of the foregoing embodiments of the present disclosure includes installing the spacer in a multiple of circumferential segments.

A further embodiment of any of the foregoing embodiments of the present disclosure includes installing the spacer in a multiple of portions, the multiple of portions comprising a forward portion and an aft portion, each of the respective portions sized to fit through a slot opening of the tangential blade slot.

A further embodiment of any of the foregoing embodiments of the present disclosure includes that each of the clearance features is a dimple.

A further embodiment of any of the foregoing embodiments of the present disclosure includes that each of the clearance features is a cut.

A further embodiment of any of the foregoing embodiments of the present disclosure includes inserting a lock into the blade slot assembly.

A further embodiment of any of the foregoing embodiments of the present disclosure includes inserting a plurality of blades prior to inserting the lock.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
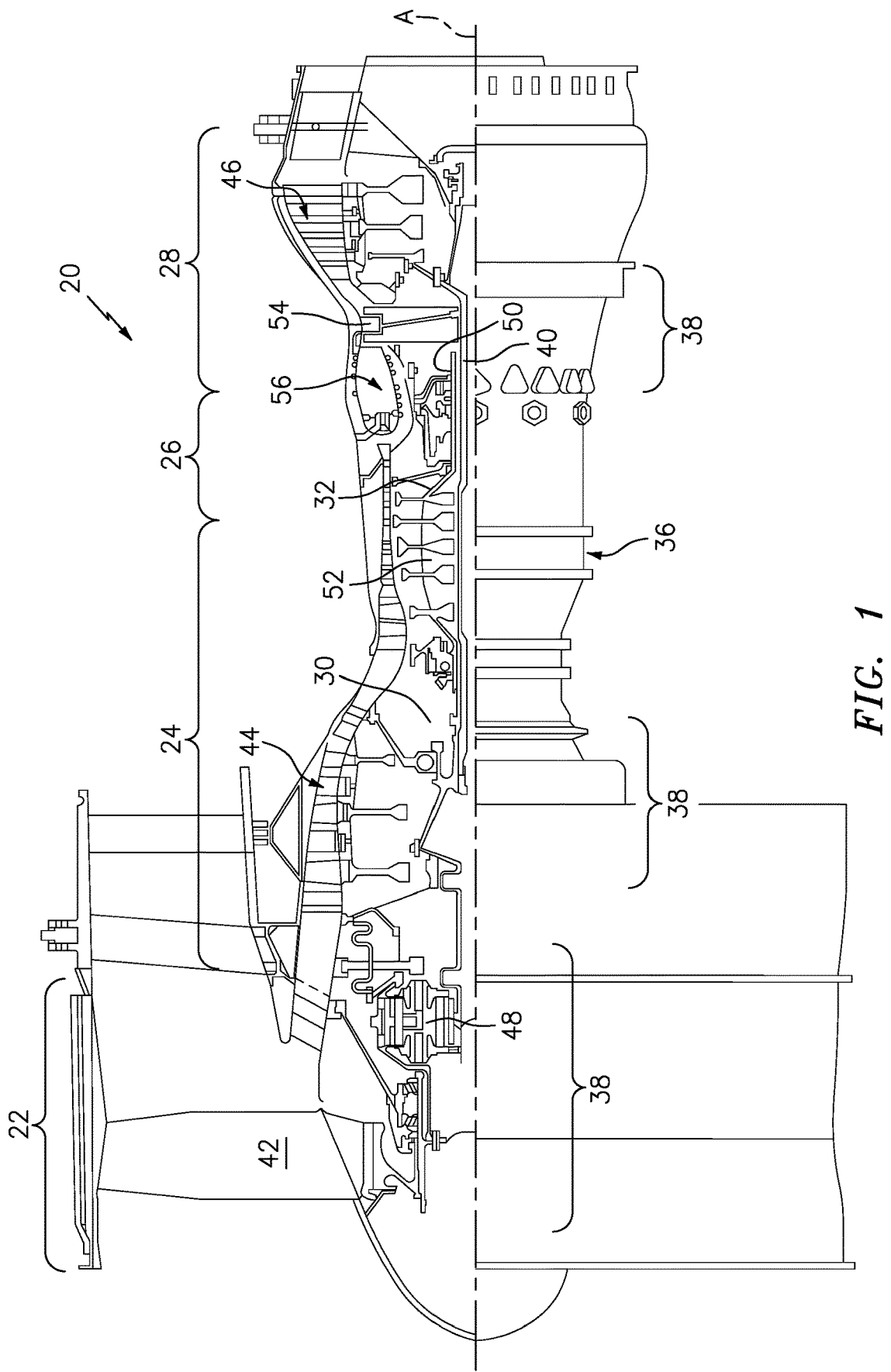
FIG. 1 is a schematic cross-section of an example gas turbine engine architecture.

FIG. 1 schematically illustrates a gas turbine engine 20. The gas turbine engine 20 as disclosed herein is a two spool turbofan that generally incorporates a fan section 22, a compressor section 24, a combustor section 26, and a turbine section 28. The fan section 22 drives air along a bypass flowpath while the compressor section 24 drives air along a high temperature core flowpath for compression and communication into the combustor section 26, then expansion through the turbine section 28. Although depicted as a high bypass gas turbofan engine architecture in the disclosed non-limiting embodiment, it should be appreciated that the concepts described herein are not limited only thereto.

The engine 20 generally includes a low spool 30 and a high spool 32 mounted for rotation around an engine central longitudinal axis A relative to an engine case structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system. The high spool 32 includes an outer shaft 50 that interconnects a high pressure compressor ("HPC") 52 and high pressure turbine ("HPT") 54. A combustor 56 is arranged between the HPC 52 and the HPT 54.

Figure 2:
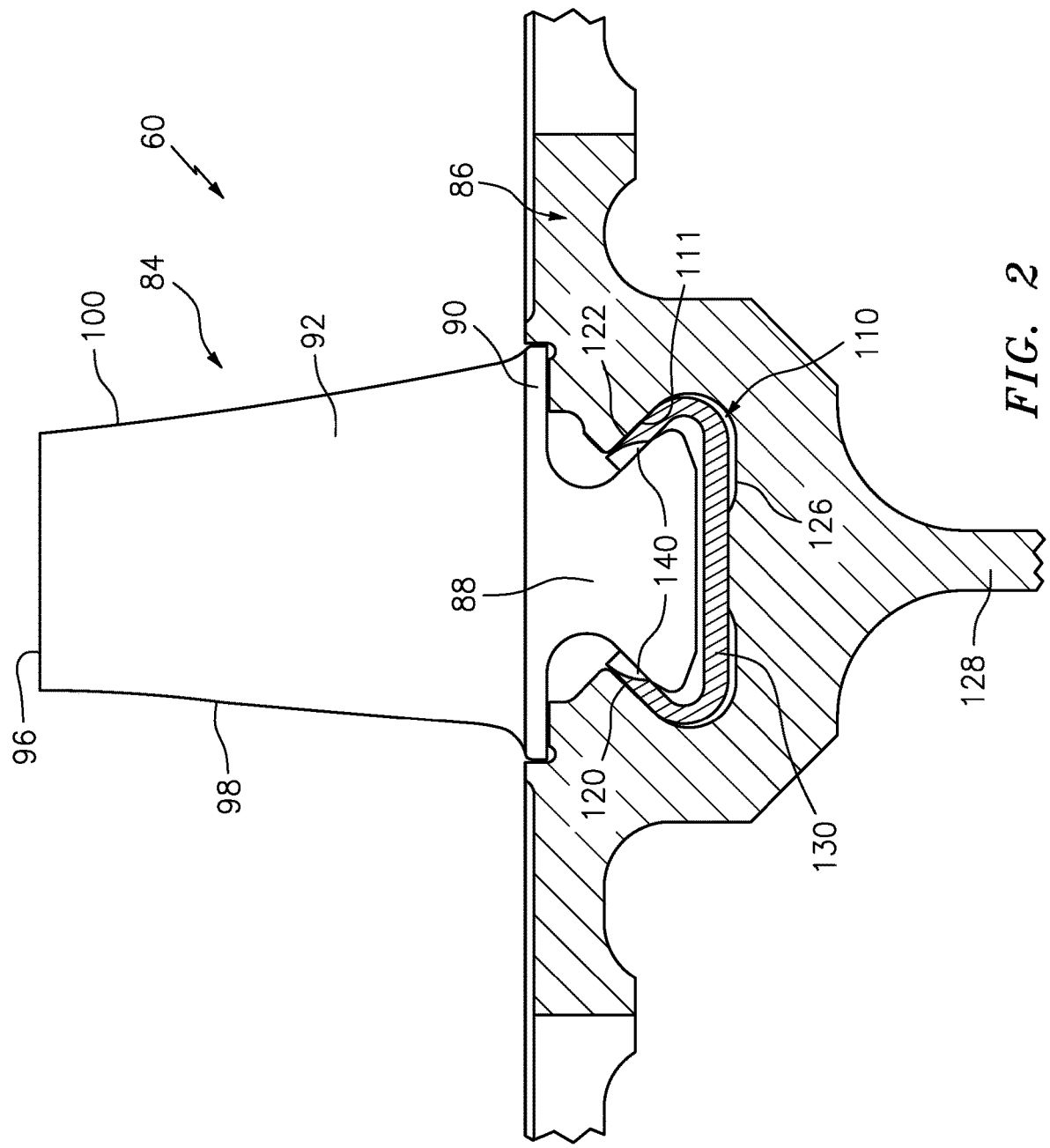
FIG. 2 is a sectional view of a rotor assembly with a single representative blade within a tangential slot having a spacer therein according to one embodiment.

With reference to FIG. 2, a rotor assembly 60 such as a turbine rotor assembly includes an array of blades 84 (one shown) circumferentially disposed around a disk 86. The disk 86 may be subtractive or additive manufactured of nickel-based super alloys, ceramics, special single crystal, composites, or other materials that operate in high temperature environments, such as, for example, environments typically encountered by aerospace and gas turbine engine hot section components. In some embodiments, the nickel-based alloy may be Inconel 718, Waspaloy, or IN-100.

Each blade 84 includes a root region 88, a platform 90 and an airfoil 92. The platform 90 separates a gas path side inclusive of the airfoil 92 and a non-gas path side inclusive of the root region 88. The airfoil 92 defines a blade chord between a leading edge 98, which may include various forward and/or aft sweep configurations, and a trailing edge 100. A first sidewall that may be convex to define a suction side, and a second sidewall that may be concave to define a pressure side are joined at the leading edge 98 and at the axially spaced trailing edge 100. A tip 96 extends between the sidewalls opposite the platform 90.

Figure 3:
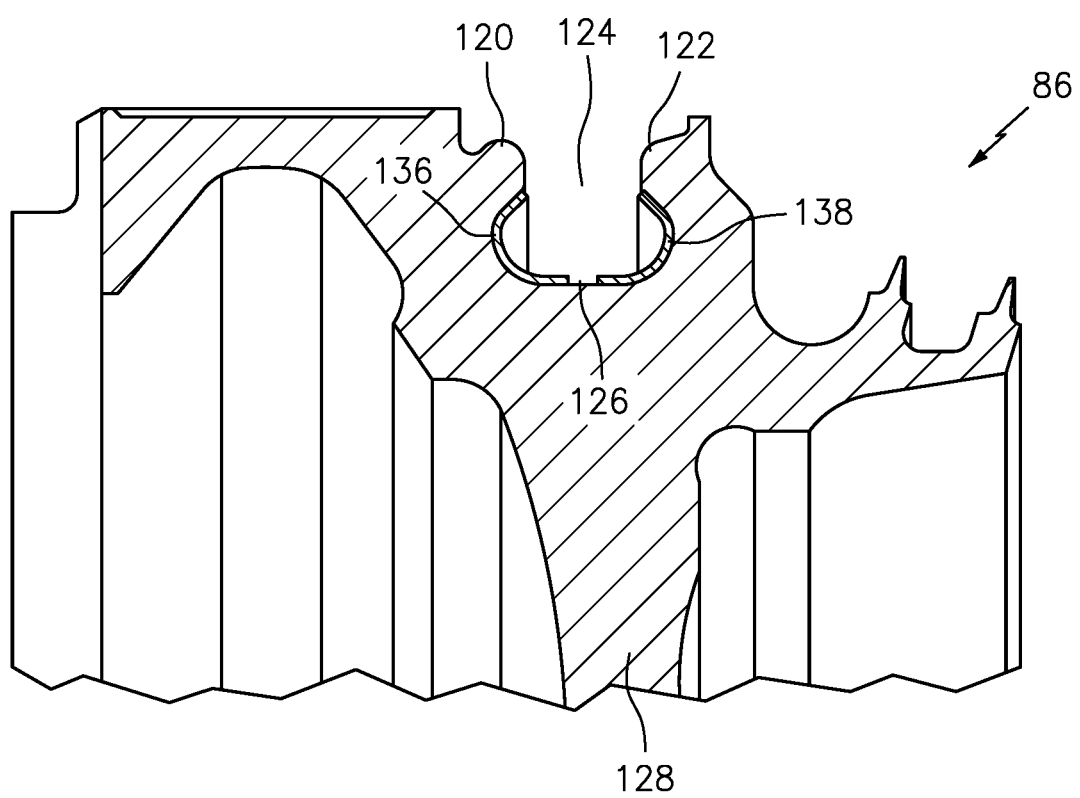
FIG. 3 is a sectional view of a rotor assembly with a tangential slot having a spacer therein according to one embodiment.

Each blade root region 88 is received within a tangential blade slot 110 formed in a rim 112 of the disk 86. The tangential blade slot 110 includes a forward rail 120 and an aft rail 122 which together form a pair of spaced rails. The forward rail 120 and the aft rail 122 are spaced apart by a slot opening 124 that is smaller than a rotor slot bottom 126 (FIG. 3). That is, the tangential blade slot 110 is generally of a continued bulb or flared shape without slots or cuts in the forward rail 120 and the aft rail 122. The rim 112 of the disk 86 is a thickened area with respect to a web 128 of the disk 86 such that the blade 84 may be significantly loaded and retained therein without stress concentrations.

A spacer 130 is received in the tangential blade slot 110 such that the spacer 130 is sandwiched between the blade root region 88, the forward rail 120 and the aft rail 122. The spacer 130 may be manufactured of nickel-based super alloys, ceramics, special single crystal, composites, or some other material that operate in high temperature environments, such as, for example, environments typically encountered by aerospace and gas turbine engine hot section components. In some embodiments, the nickel-based alloy may be Inconel 718, Waspaloy, or IN-100. The spacer 130 may be relatively thin and formed to be generally equivalent to a shape of an inner contact surface 111 of the tangential blade slot 110 that is in contact with the root region 88.

Figure 4:
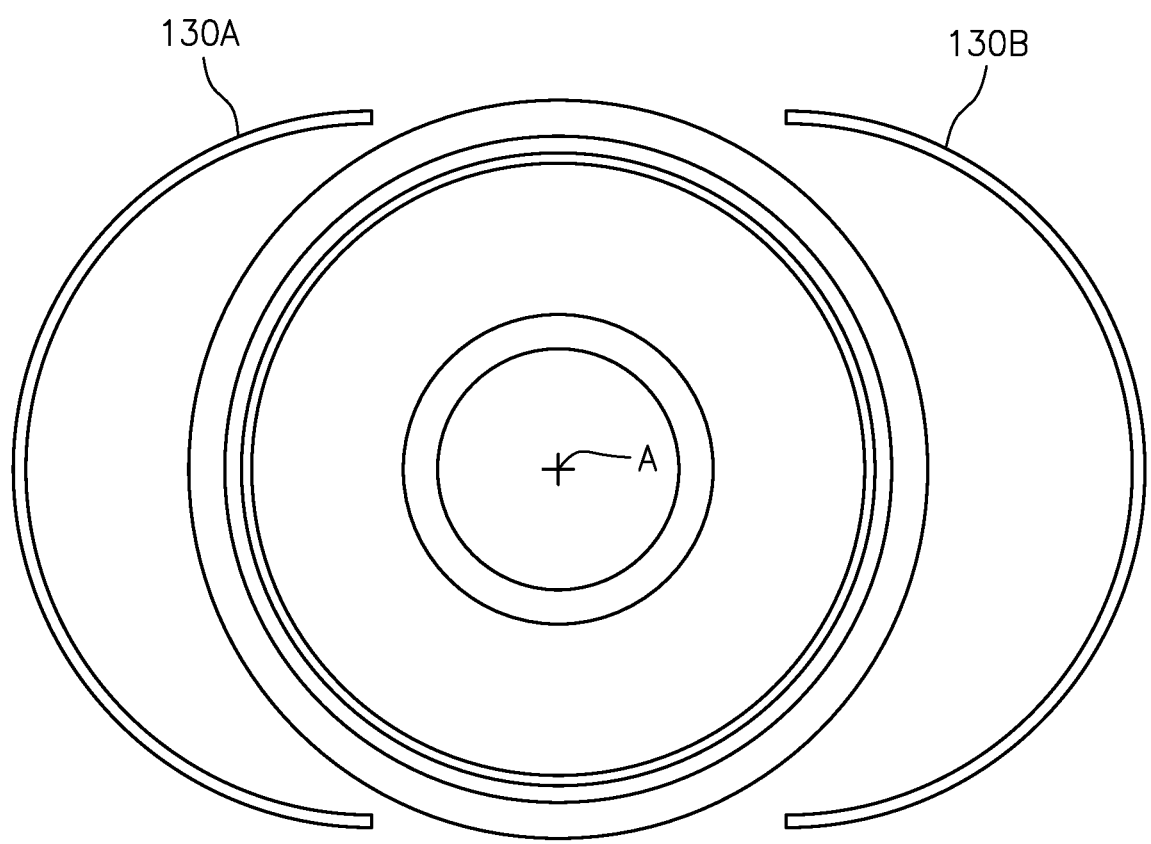
FIG. 4 is a front view of a rotor assembly with a spacer formed of a first circumferential segment and a second circumferential segment which are received radially into the tangential blade slot according to one embodiment.

The spacer 130 may be manufactured of a multiple of segments. In one embodiment, the spacer 130 may include a first circumferential segment 130A and a second circumferential segment 130B which are received radially into the tangential blade slot 110 (FIG. 4). Any number of segments may alternatively be utilized.

Figure 5:
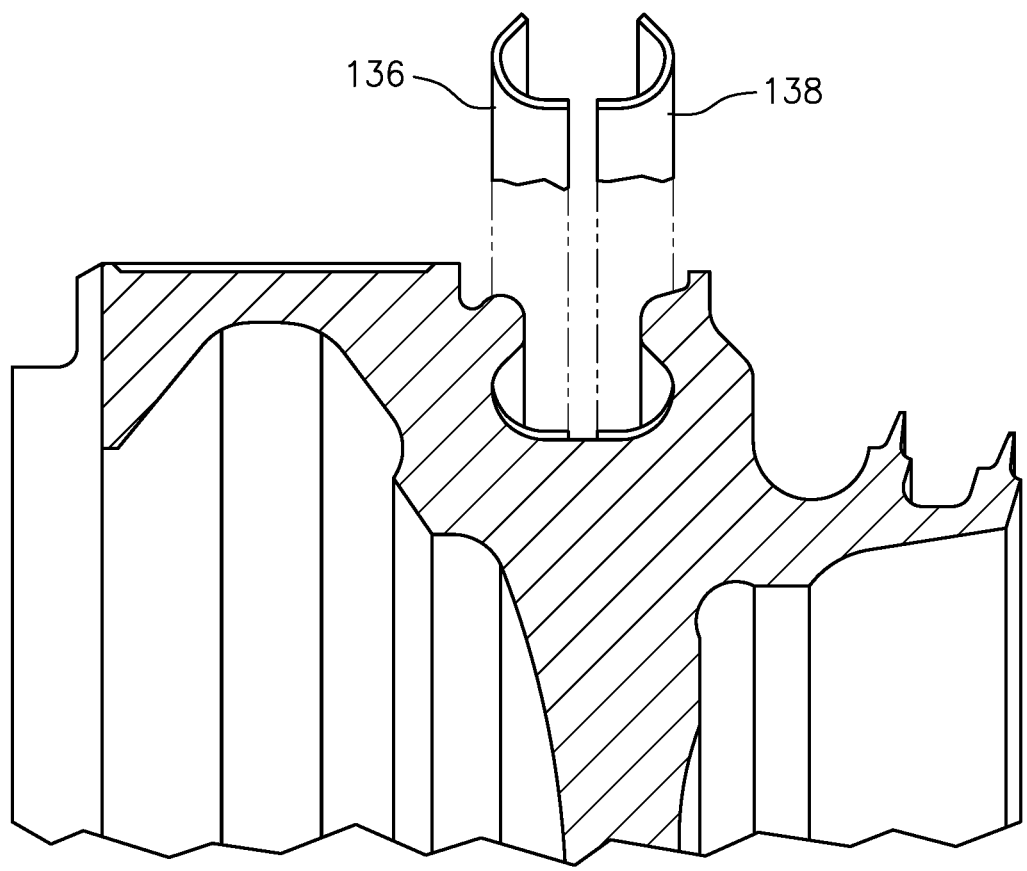
FIG. 5 is a sectional view of a rotor assembly with a spacer formed of a forward segment portion and an aft segment portion which are sized to fit through the slot opening.

Each segment 130A, 130B may be further separated into a forward segment portion 136 and an aft segment portion 138 (FIG. 3). The respective segment portions 136, 138 are sized to fit through the slot opening 124 (FIG. 5). The forward segment portion 136 is installed though the slot opening 124 then moved respectively forward to be retained at least partially between the forward rail 120 and the rotor slot bottom 126. The aft portion 138 is installed though the slot opening 124 then moved respectively aft to be retained at least partially between the aft rail 122 and the rotor slot bottom 126. The spacer 130 lines the inner contact surface 111 of the forward and aft rails 120, 122. The spacer 130 may also be spaced from the rotor slot bottom 126 to operate as a heat shield for the tangential blade slot 110 and.

Figure 6:
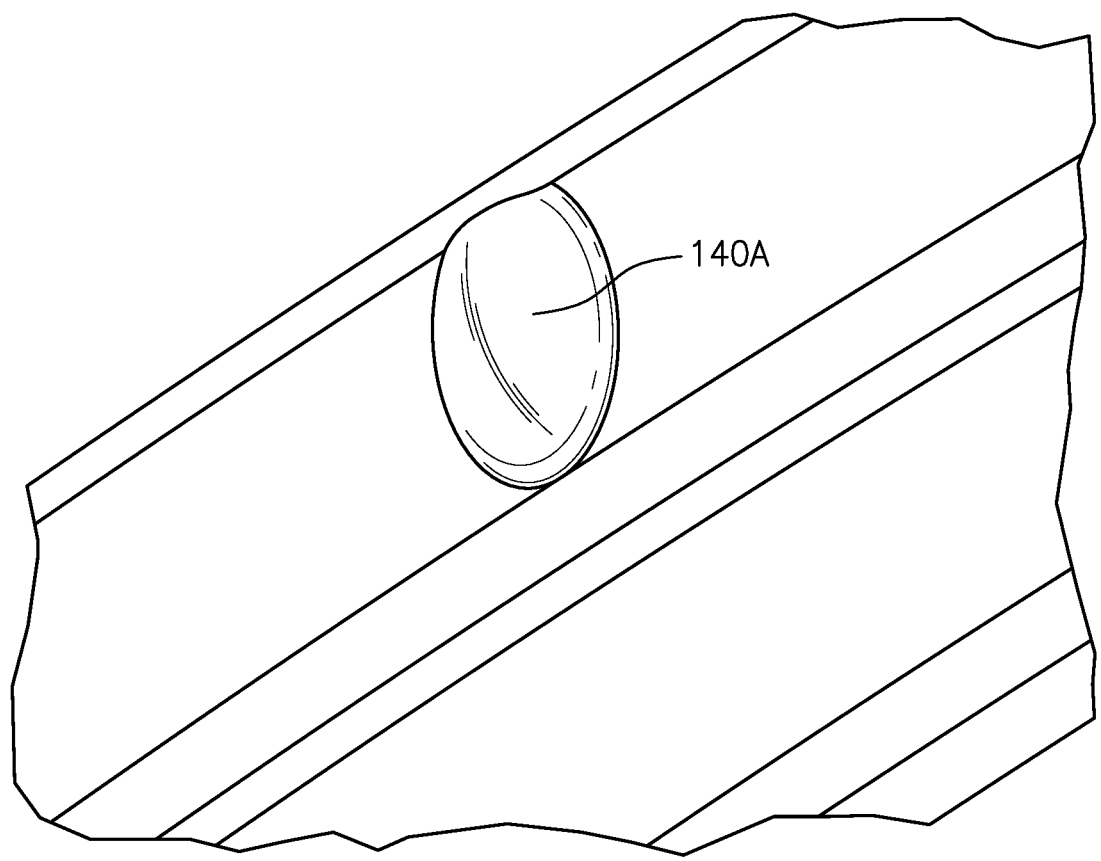
FIG. 6 is a sectional view of a rotor assembly with a spacer having a clearance feature according to one embodiment.
Figure 7:
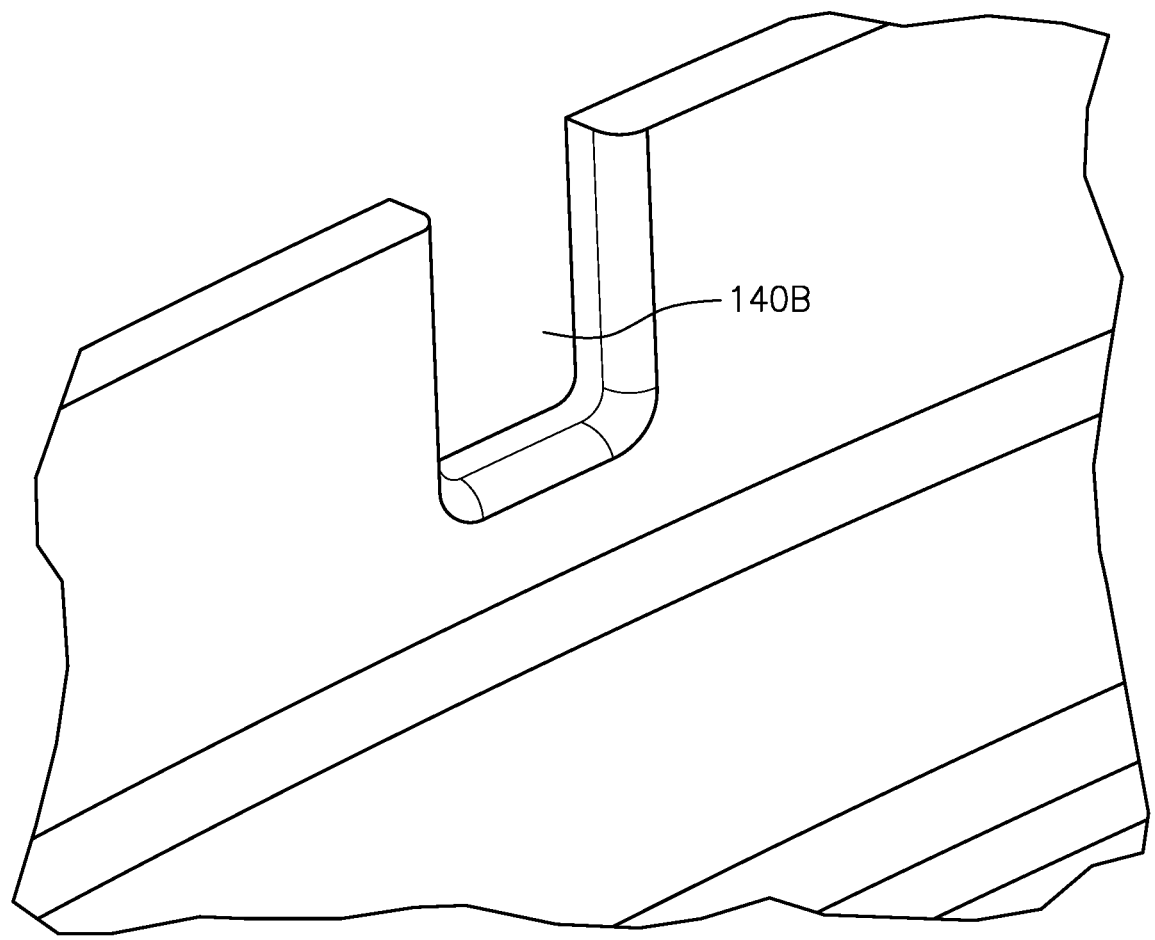
FIG. 7 is a sectional view of a rotor assembly with a spacer having a clearance feature according to another embodiment.

The spacer 130 includes a multiple of clearance features 140. The clearance features 140 may, for example, be formed as dimples 140A (FIG. 6), as cuts 140B (FIG. 7), or combinations thereof. The clearance features 140 may be positioned in an opposed arrangement adjacent to the respective forward rail 120 and the aft rail 122. That is, two clearance features 140 are arranged along an axis parallel to the engine axis A. The clearance features 140 are applied to the spacer 130, not the disk itself to thereby eliminate stress concentrations otherwise formed in the rotor disk. This allows the tangential blades to be installed radially inward and rotated 90 degrees without contacting or affecting rotor attachment geometry of the forward rail 120 and the aft rail 122.

Figure 8:
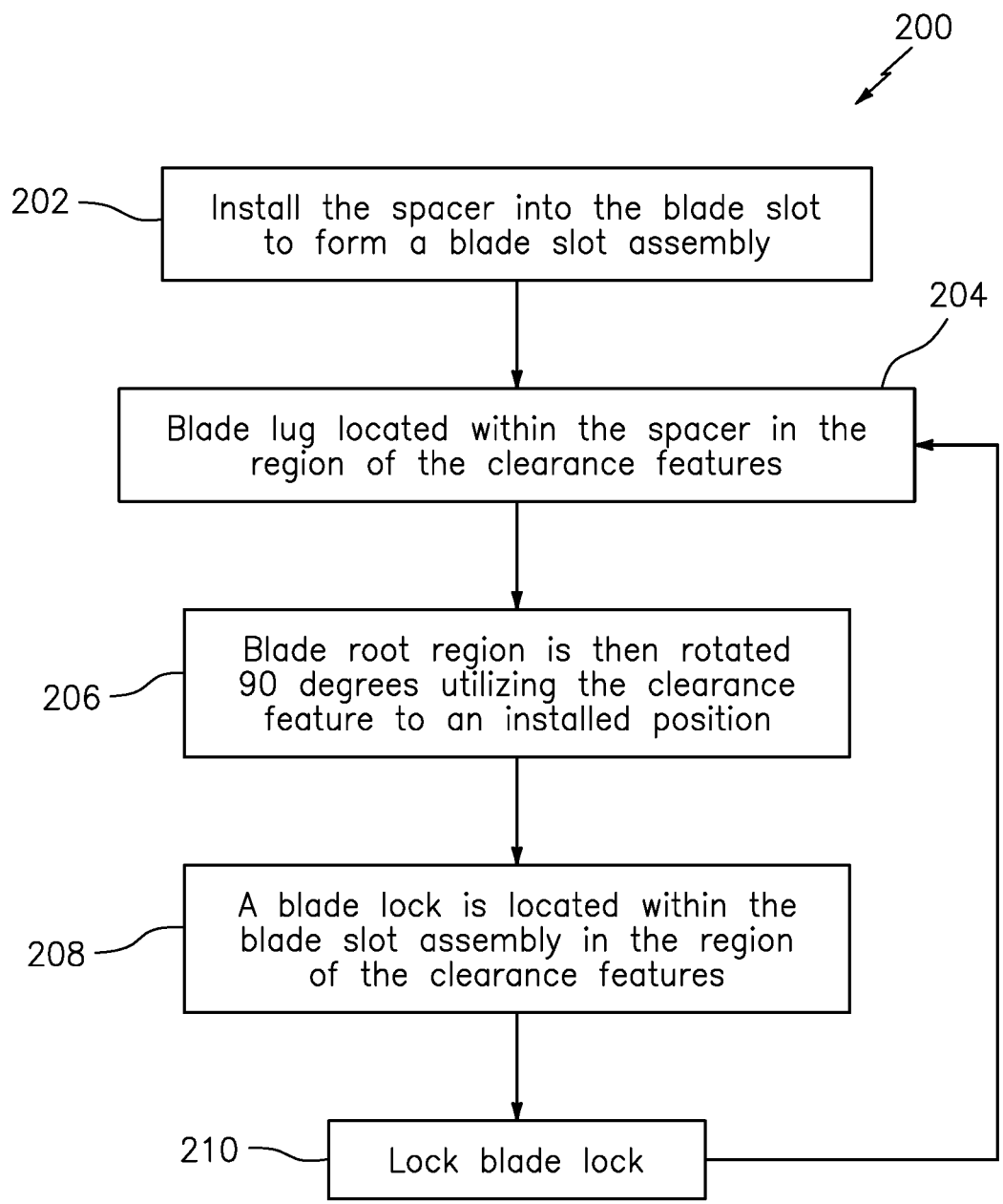
FIG. 8 is a method of assembling a rotor assembly according to one embodiment.

With reference to FIG. 8, a method (200) of assembling the blades 84 to the disk 86 initially includes installing the spacer 130 into the tangential blade slot 110 (202). The spacer 130, once mounted within the tangential blade slot 110, forms a blade slot assembly 134.

Figure 9:
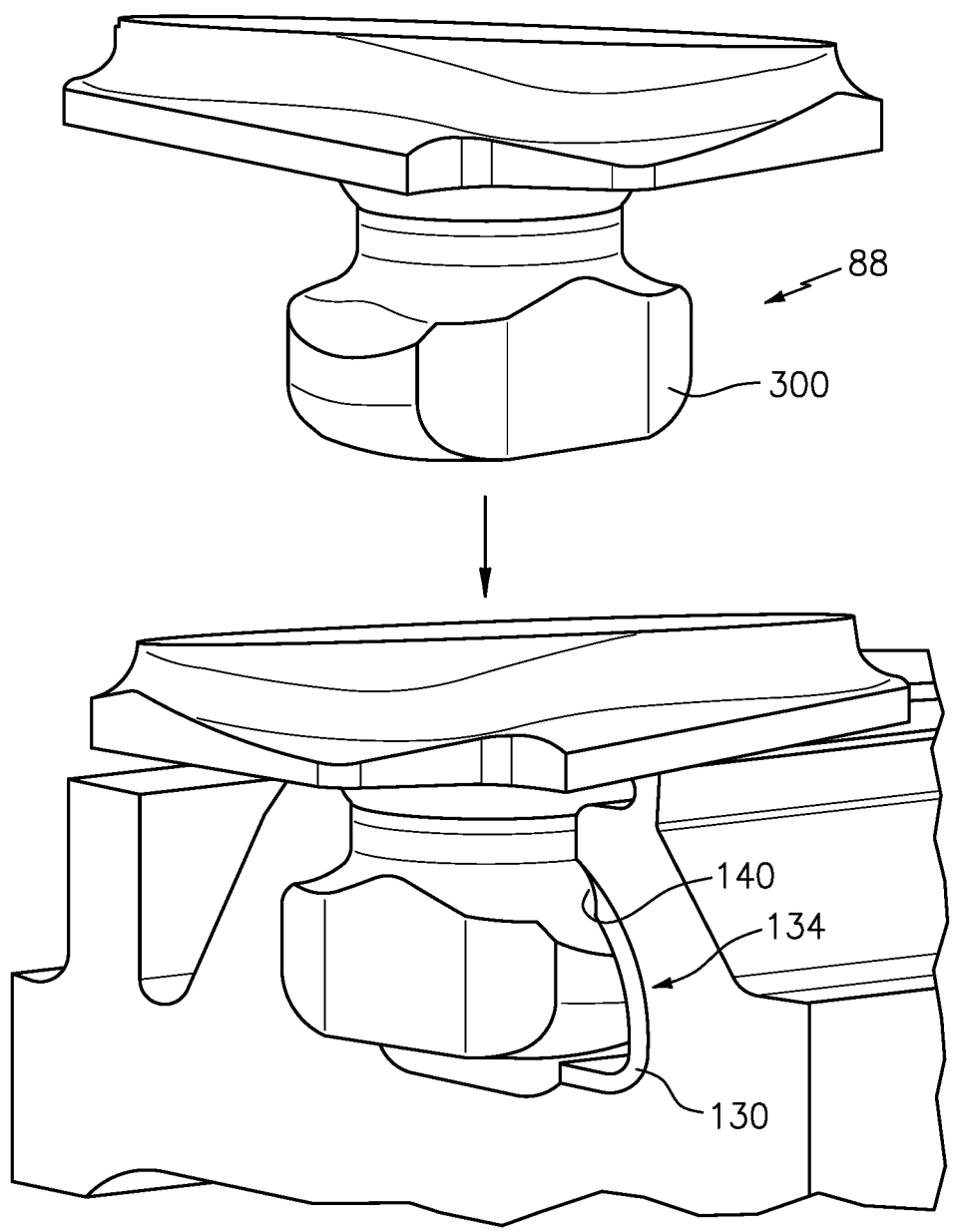
FIG. 9 is a sectional view of a rotor assembly with a single representative blade lug being inserted into a tangential slot having a spacer therein according to one embodiment.
Figure 10:
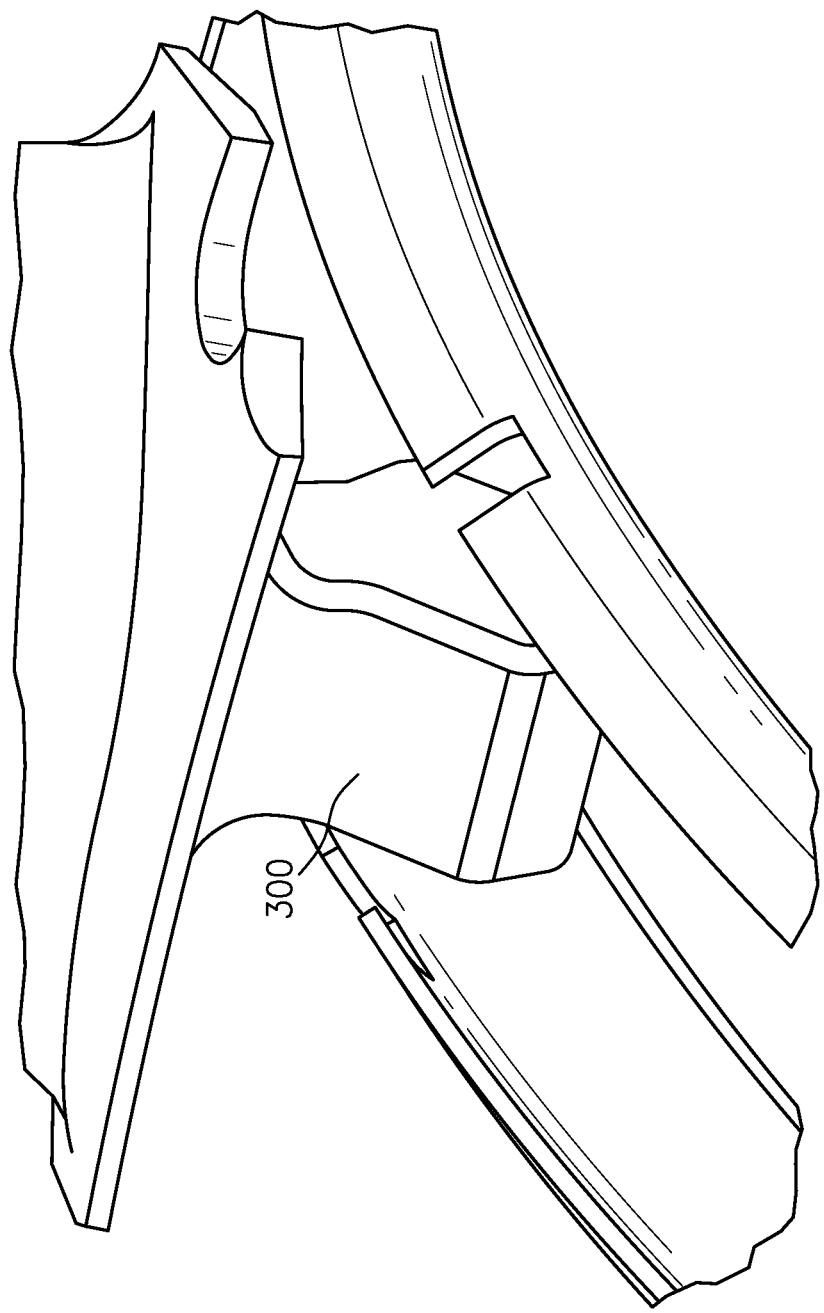
FIG. 10 is a top view of the rotor assembly with the single representative blade lug being inserted into the tangential slot having the spacer as shown in FIG. 9.
Figure 11:
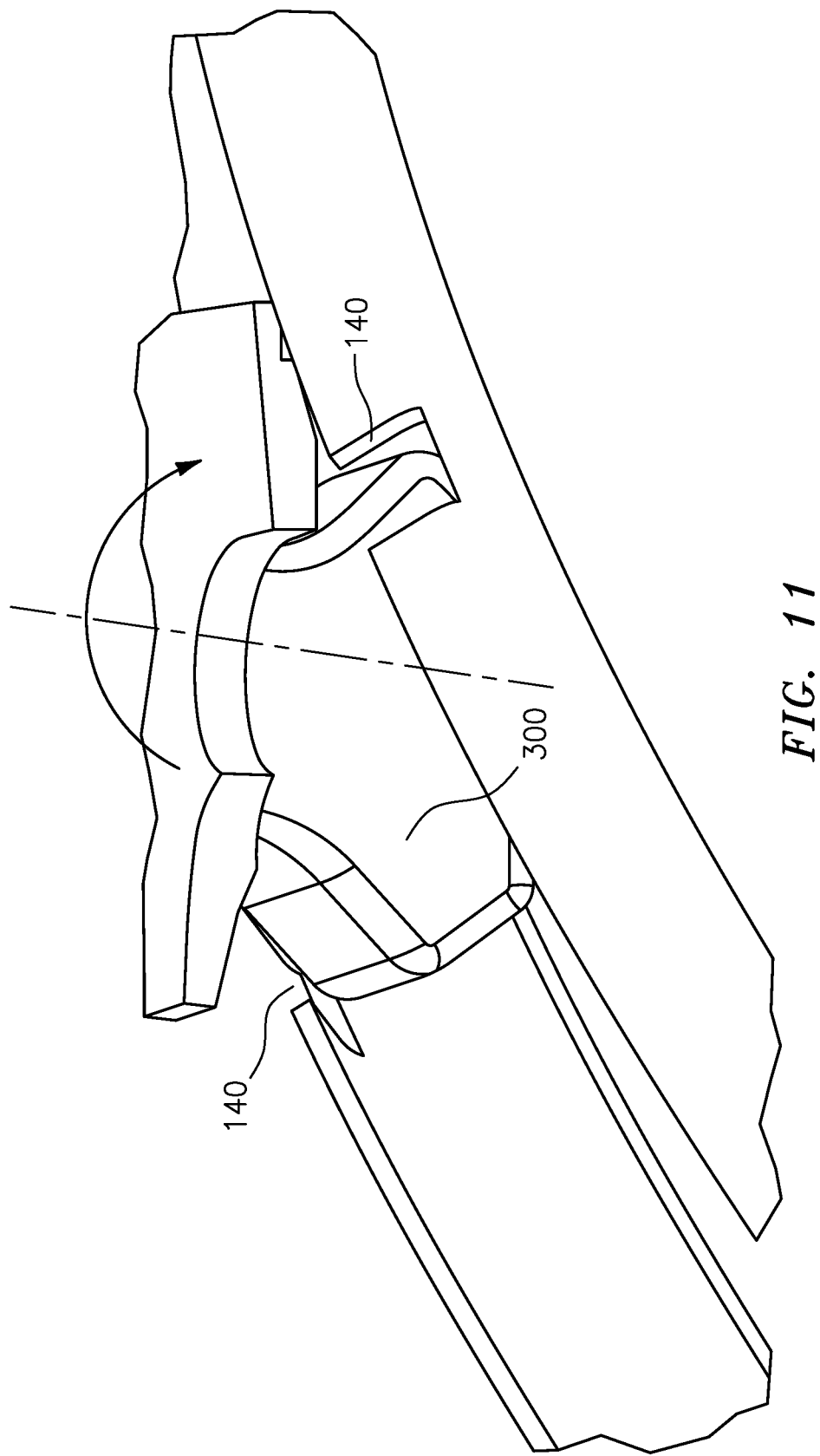
FIG. 11 is a top view of the rotor assembly with the single representative blade lug being rotated toward an installed position with the lug using the clearance feature to permit rotation.
Figure 12:
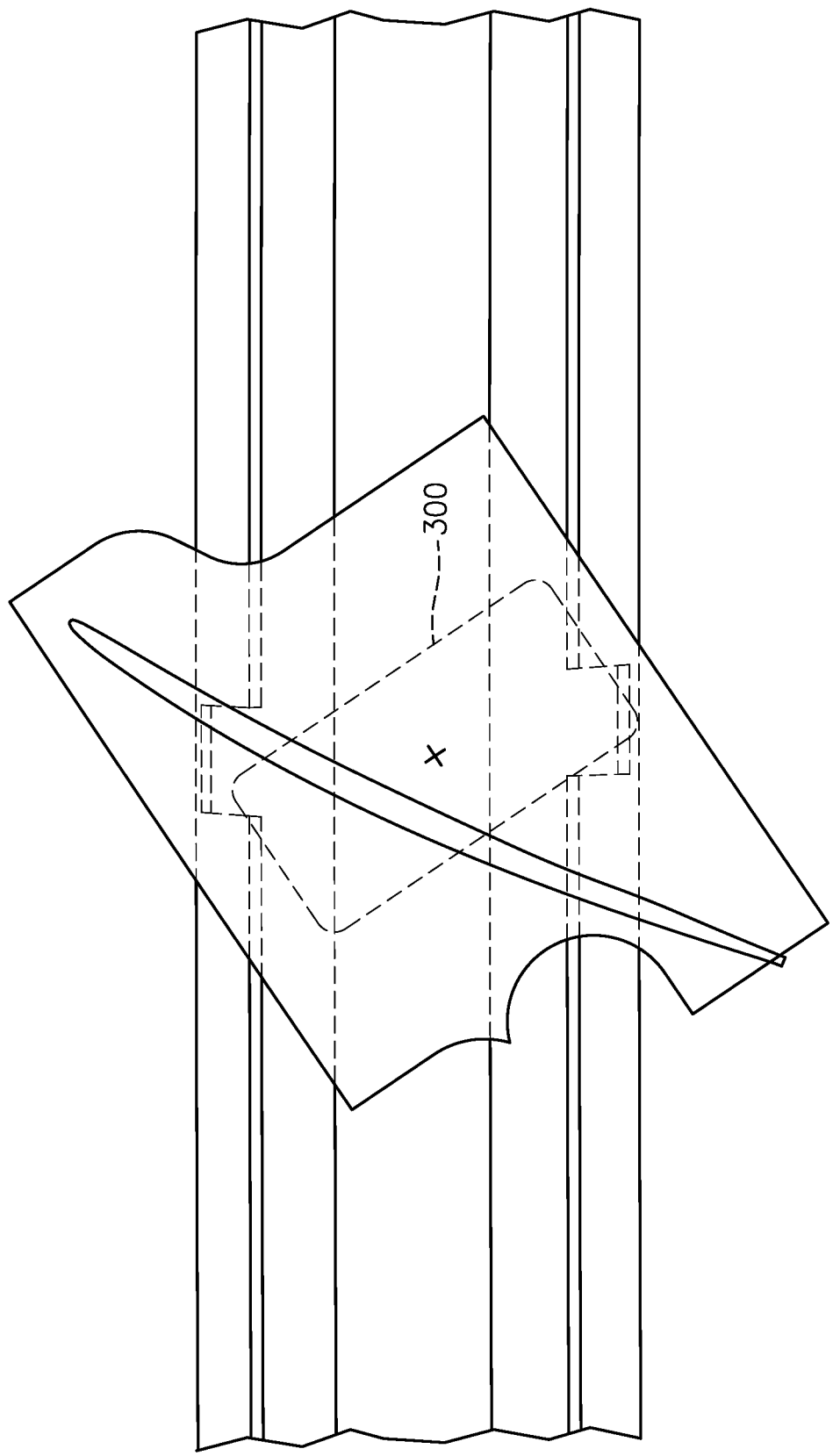
FIG. 12 is a top view of the rotor assembly with the single representative blade lug in the installed position.
Figure 13:
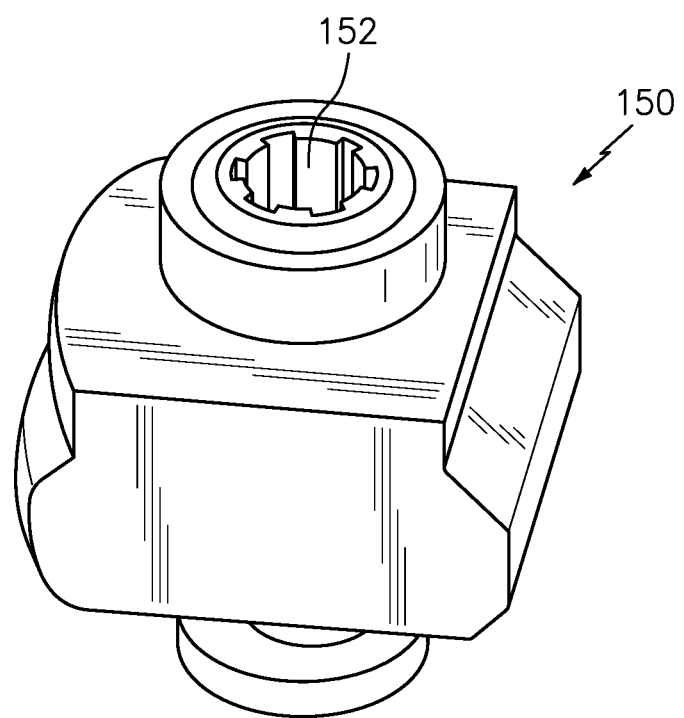
FIG. 13 is a perspective view of a blade lock.

A blade lug 300 (FIG. 9) of the blade root region 88 of each blade 84 is then located within the tangential blade slot assembly 134 in the region of the clearance features 140 (204) in an insertion position (FIG. 10). The blade root region 88 is then rotated 90 degrees (FIG. 11) utilizing the clearance feature 140 (206) to an installed position (FIG. 12). The blade 84 may then be slid within the tangential blade slot assembly 134 to a desired position. Typically, an array of 4-8 blades 84 are mounted through the same clearance feature 140 and each array of blades is separated by a blade lock 150 (FIG. 13).

Figure 14:
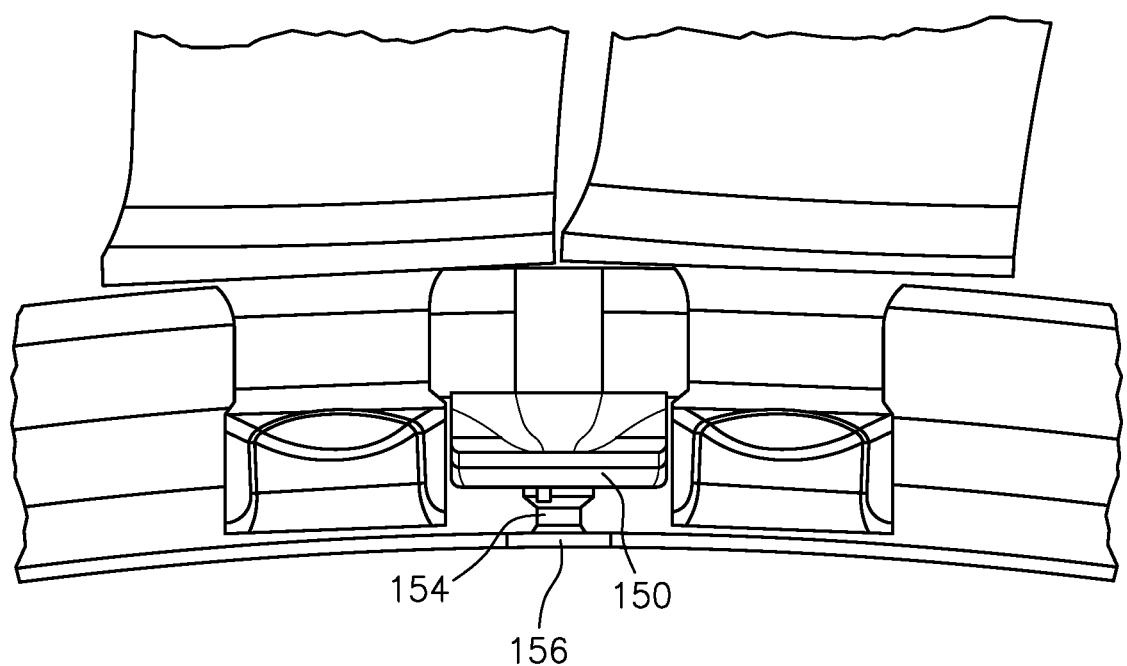
FIG. 14 is a front sectional view of the blade lock in the installed position.

Next, the blade lock 150 (FIG. 14) is located within the tangential blade slot assembly 134 in the region of the clearance features 140 (208). A set screw 152 (FIG. 13) of the blade lock 150 is then tightened to extend the set screw 154 into an aperture 156 formed in the bottom 126 of the tangential blade slot 110 (210). The aperture 154 formed in the bottom 126 of the tangential blade slot 110 may be located in line with the clearance features 140. In another embodiment, the spacer 130 may include an aperture or portion thereof which permits passage of the set screw 154. In another embodiment, each segment may be associated with a subset array of the blades such as the 4-8 blades such that the set screw passes between the associated segments.

The blade lock 150 locks the circumferential position of the blade array to accommodate proper radial spacing of the blades 84. A blade lug 300 of the next blade in the next array of blades is then located within the tangential blade slot assembly 134 in the region of the next clearance features 140.

Figure 15:
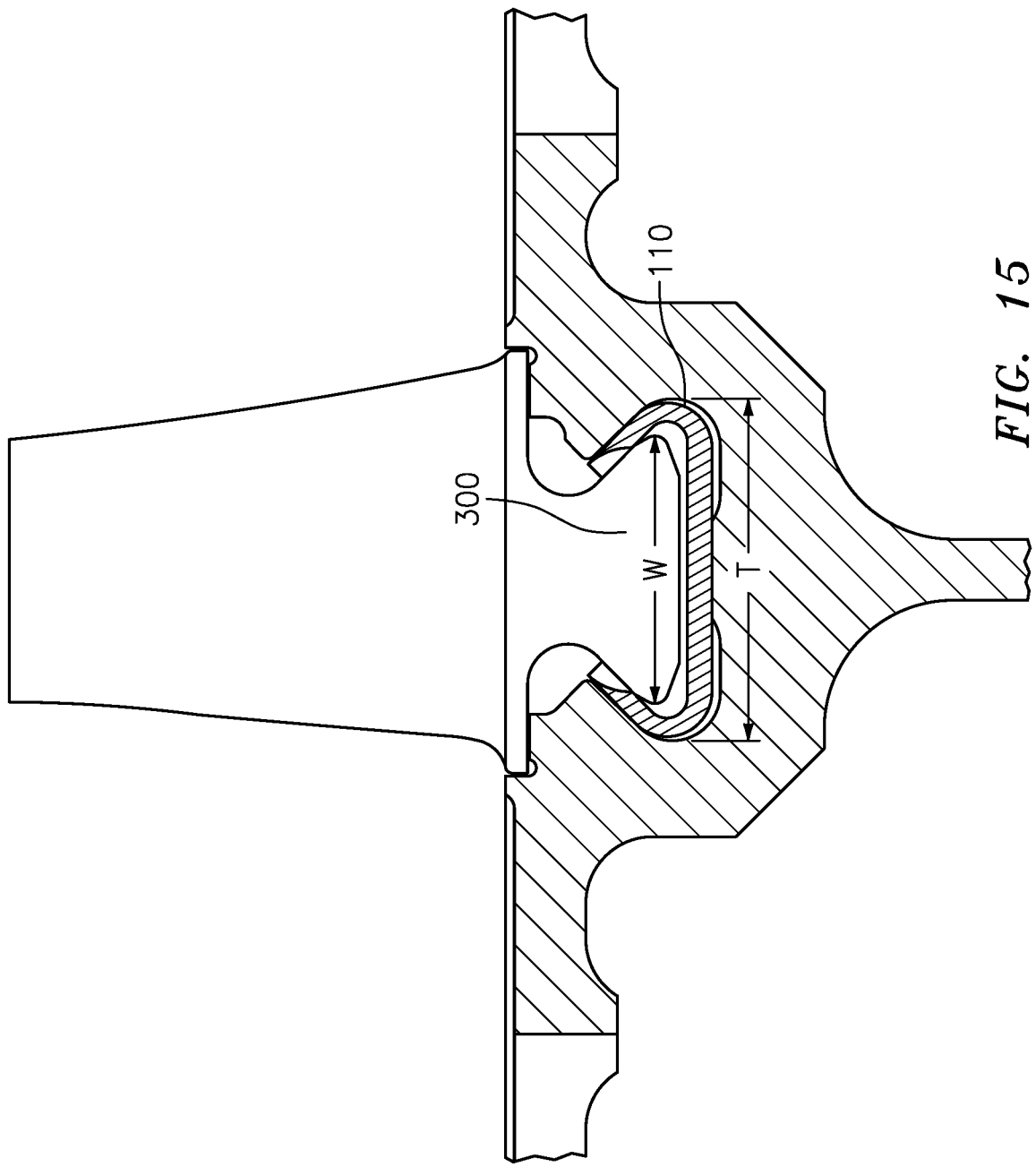
FIG. 15 is a sectional view of a blade lug within the tangential slot having the spacer therein according to one embodiment.

With reference to FIG. 15, the blade lug 300 of the blade root region 88 defines a maximum blade lug width W. The tangential blade slot 110 in the rim 112 of the disk 86 defines a maximum slot width T. In one embodiment, the slot width T is about 5%-15% larger than the blade root width W with the difference being filled by the spacer 130. The spacer 130 eliminates stress concentrations caused by the load and/or lock slots in tangentially bladed rotor disks that are already subject to high centripetal loads and temperatures in operation.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A rotor disk assembly for a gas turbine engine, comprising:
   a rotor disk that defines an axis, the rotor disk comprising a tangential blade slot within a rim of the disk;
   a multiple of arrays of rotor blades, each rotor blade in the multiple of arrays of rotor blades comprising a blade lug that defines a maximum blade lug width; and
   a spacer inserted within the tangential blade slot forming a blade slot assembly, the spacer having a clearance feature sized to permit rotation of the rotor blade 90 degrees using the clearance feature from an insertion position to an installed position, the tangential blade slot defines a maximum slot width, the slot width 5%-15% larger than the maximum blade lug width.

2. The assembly as recited in claim 1, wherein the clearance feature is a dimple.

3. The assembly as recited in claim 1, wherein the clearance feature is a cut.

4. The assembly as recited in claim 1, wherein the spacer is comprised of a multiple of circumferential segments.

5. The assembly as recited in claim 1, wherein the clearance feature is one of a multiple of clearance features, each two of the multiple of the clearance features are circumferentially spaced to receive 4 to 8 rotor blades therebetween.

6. The assembly as recited in claim 1, wherein the slot within the rim of the disk comprises a forward rail and an aft rail spaced apart by a slot opening that is smaller than a rotor slot bottom.

7. The assembly as recited in claim 6, wherein the forward rail and the aft rail are continuous.

8. The assembly as recited in claim 6, wherein the spacer is comprised of a forward portion and an aft portion, each of the respective portions sized to fit through the slot opening.

9. The assembly as recited in claim 1, further comprising a blade lock between each two arrays of the multiple of arrays of rotor blades.

10. The assembly as recited in claim 1, wherein each array of the multiple of arrays of rotor blades comprise 4-8 rotor blades.

11. A method for assembling a rotor disk assembly, comprising the steps of:
   providing a disk having a tangential blade slot;
   installing a spacer within the tangential blade slot forming a blade slot assembly, the spacer having a clearance feature sized to allow for blade rotation from an insertion position to an installed position;

inserting the blade in the tangential blade slot assembly proximate to the clearance feature;

rotating the blade 90 degrees using the clearance feature to the installed position.

12. The method as recited in claim 11, further comprising installing the spacer in a multiple of circumferential segments.

13. The method as recited in claim 11, further comprising installing the spacer in a multiple of portions, the multiple of portions comprising a forward portion and an aft portion, each of the respective portions sized to fit through a slot opening of the tangential blade slot.

14. The method as recited in claim 11, wherein the clearance feature is a dimple.

15. The method as recited in claim 11, wherein the clearance feature is a cut.

16. The method as recited in claim 11, further comprising inserting a lock into the blade slot assembly.

17. The method according to claim 16, further comprising inserting a plurality of blades prior to inserting the lock.

* * * * *